United States Patent
Si et al.

(10) Patent No.: US 9,262,424 B1
(45) Date of Patent: Feb. 16, 2016

(54) TECHNIQUES FOR PERFORMING SLICE CONSISTENCY CHECKS

(71) Applicant: EMC Corporation, Hopkinton, MA (US)

(72) Inventors: Yining Si, Shrewsbury, MA (US); Jean-Pierre Bono, Westborough, MA (US); Miles A. de Forest, Bahama, NC (US); Ye Zhang, Shanghai (CN); William Davenport, Burlington, MA (US); Srinivasa Rao Vempati, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 399 days.

(21) Appl. No.: 13/837,751

(22) Filed: Mar. 15, 2013

(51) Int. Cl.
  *G06F 7/00* (2006.01)
  *G06F 17/30* (2006.01)

(52) U.S. Cl.
  CPC .... *G06F 17/30082* (2013.01); *G06F 17/30303* (2013.01); *G06F 17/30371* (2013.01)

(58) Field of Classification Search
  CPC ..................... G06F 17/30371; G06F 17/30303
  USPC ........................................................ 707/690
  See application file for complete search history.

(56) References Cited

U.S. PATENT DOCUMENTS

| | | | |
|---|---|---|---|
| 6,499,039 B1 * | 12/2002 | Venkatesh et al. | |
| 7,631,155 B1 * | 12/2009 | Bono et al. | 711/156 |
| 7,873,619 B1 * | 1/2011 | Faibish et al. | 707/705 |
| 7,882,386 B1 * | 2/2011 | Potnis et al. | 714/2 |
| 8,037,345 B1 * | 10/2011 | Iyer et al. | 714/6.12 |
| 8,285,758 B1 * | 10/2012 | Bono et al. | 707/822 |
| 8,479,046 B1 * | 7/2013 | Bailey et al. | 714/25 |
| 8,577,855 B2 | 11/2013 | Shyam et al. | |
| 8,843,533 B1 | 9/2014 | Sukumar et al. | |
| 8,886,611 B2 | 11/2014 | Caputo | |
| 8,972,340 B1 * | 3/2015 | Haase et al. | 707/609 |
| 2008/0222152 A1 | 9/2008 | Godbole | |
| 2012/0117035 A1 | 5/2012 | Ranade et al. | |
| 2012/0215970 A1 * | 8/2012 | Shats | 711/103 |

OTHER PUBLICATIONS

Srinivasa Rao Vempati; "Accessing a File System During a File System Check"; U.S. Appl. No. 13/832,705, filed Mar. 15, 2013.

* cited by examiner

*Primary Examiner* — Mark E Hershley
(74) *Attorney, Agent, or Firm* — BainwoodHuang

(57) ABSTRACT

A slice consistency check method is presented including, for each slice of a plurality of slices (a) obtaining a first vote for ownership of that slice according to a filesystem manager configured to manage a set of filesystems stored on a set of sparse metavolumes, (b) obtaining a second vote for the ownership of that slice according to a first driver, the first driver being independent of the filesystem manager, (c) obtaining a third vote for the ownership of that slice according to a second driver, the second driver being independent of the filesystem manager and the first driver, and (d) assigning ownership of that slice based on a majority vote of the first vote for the ownership of that slice, the second vote for the ownership of that slice, and the third vote for the ownership of that slice.

13 Claims, 5 Drawing Sheets

| 46 Slice Ownership Table | | | | | |
|---|---|---|---|---|---|
| 130 Slice Info | 140 FS Owership | 150 SAT Ownership | 160 Sparse Metavolume Ownership | | |
| | | | 161 Vote | 162 SME subvote | 164 SM subvote |
| S1 | FS1/A1 | FS1/A1 | FS1/A1 | FS1/A1 | FS1/A1 |
| S2 | FS2/A2 | FS2/A2 | VOID | FS2/A5 | FS2/A2 |
| . | . | . | . | . | . |
| . | . | . | . | . | . |
| . | . | . | . | . | . |
| Sq | FS5/A5 | FSq/Aq | FS3/A3 | VOID | FS3A3 |

TECHNIQUES FOR PERFORMING SLICE CONSISTENCY CHECKS

BACKGROUND

In a data storage system, a filesystem typically is stored on a volume provided by the data storage system. In some advanced data storage systems, the volume on which the filesystem is stored is a sparse metavolume populated by data storage slices of a fixed size provisioned from a pool of slices. The pool of slices aggregates slices provided by storage volumes, known as Flare LUNs (FLUs). A system having a similar arrangement is described in further detail in U.S. Pat. No. 8,285,758, the contents and teachings of which are hereby fully incorporated herein by this reference.

Under various conditions, such as in response to a corruption event, a slice consistency check is performed in order ensure that each slice is properly assigned to the appropriate sparse metavolume and filesystem. The slice consistency check involves ascertaining the ownership of each slice in the system according to (1) a software layer responsible for allocating slices from the FLUs, (2) a slice map maintained by a software layer responsible for managing the sparse metavolume, and (3) a set of linked slice marks maintained by the software layer responsible for managing the sparse metavolume.

SUMMARY

The above-described conventional approach to performing a slice consistency check in a data storage system may not be optimal. For example, although a conventional slice consistency check involves looking at slice ownership from various perspectives, conventional initial slice consistency checks do not look at slice ownership from the perspective of the filesystem. However, after performing the initial slice consistency check, the slices are actually placed within a filesystem associated with the sparse metavolume owner, but, if the ownership was determined incorrectly by the slice consistency check, then the filesystem would fail to operate correctly. Furthermore, because the slice map and the slice marks are both under the control of a single software layer responsible for managing the sparse metavolume, it is possible for both the slice map and the slice marks to contain the same mistaken data about slice ownership.

Thus, it would be desirable to perform an improved initial slice consistency check which gives an ownership vote to a filesystem management layer. It would further be desirable for the perspectives of the slice map and the slice marks to be combined into a single vote. Thus, an improved technique involves performing a slice consistency check using a majority voting algorithm giving one vote to a filesystem management layer, one vote to a sparse metavolume management layer (combining views of the slice map and the slice marks), and one vote to a slice management layer.

Several embodiments of the improved technique are directed to a method of performing a slice consistency check in a data storage system (DSS). The DSS has a plurality of drives, the plurality of drives forming a plurality of storage volumes. Each storage volume provides a plurality of data storage slices. The DSS has a set of sparse metavolumes, each sparse metavolume having a set of slices owned by that metavolume, the set of slices providing storage for that sparse metavolume. The method includes, for each slice of a plurality of slices of the set of slices (a) obtaining a first vote for ownership of the respective slice according to a filesystem manager configured to manage a set of filesystems stored on the set of sparse metavolumes, (b) obtaining a second vote for the ownership of the respective slice according to a first driver of the DSS, the first driver being independent of the filesystem manager, (c) obtaining a third vote for the ownership of the respective slice according to a second driver of the DSS, the second driver being independent of the filesystem manager and the first driver, and (d) assigning ownership of the respective slice based on a majority vote of the first vote for the ownership of the respective slice, the second vote for the ownership of the respective slice, and the third vote for the ownership of the respective slice. Other embodiments are directed to a computerized apparatus and a computer program product for performing a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to techniques for performing a slice consistency check using a 2:1 voting algorithm giving one vote to a filesystem management layer, one vote to a sparse metavolume management layer (combining views of the slice map and the slice marks), and one vote to a slice management layer.

Figure 1:
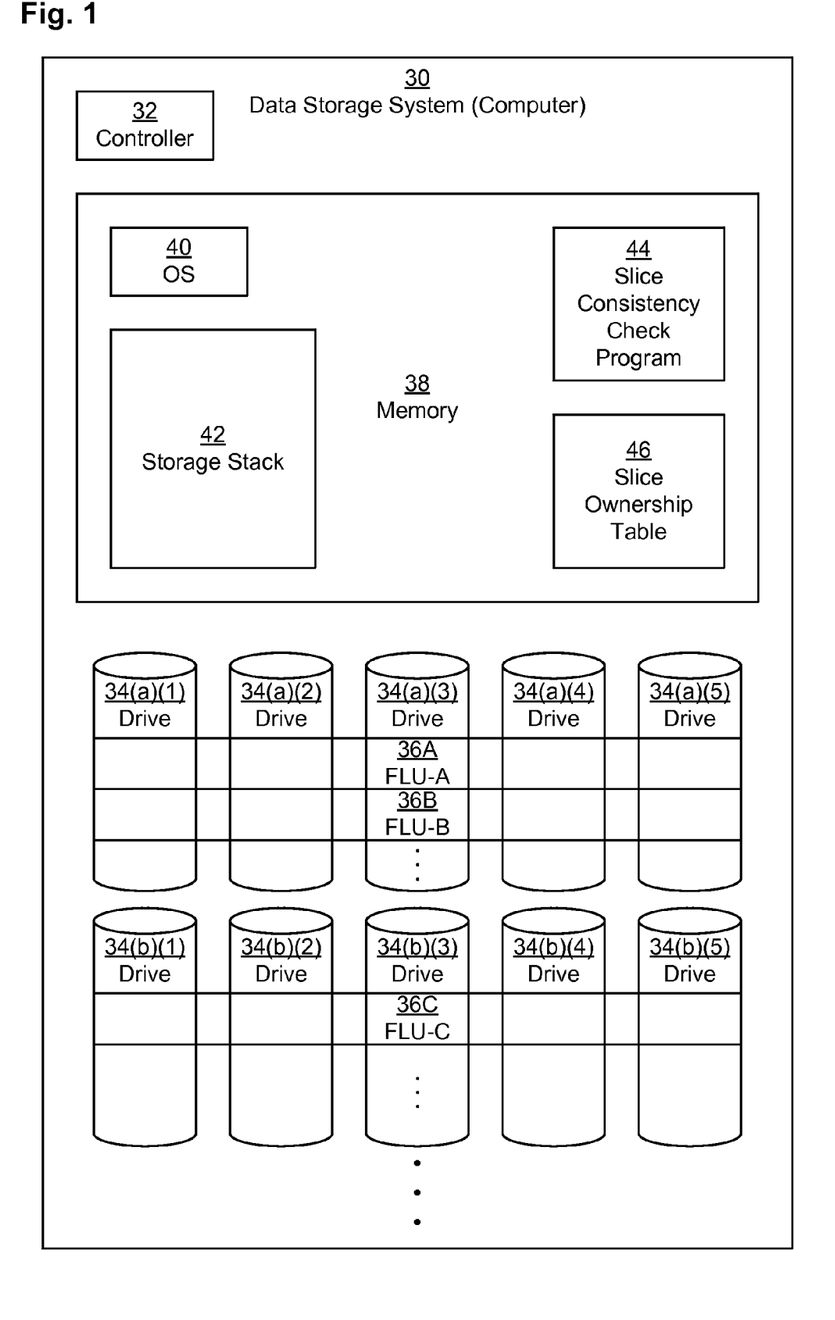
FIG. 1 depicts an example apparatus according to various embodiments.

FIG. 1 depicts an example data storage system (DSS) 30, such as, for example, a NAS data storage system, which provides access to one or more filesystems stored thereon, or a SAN data storage system, which provides block-based access to one or more volumes stored thereon. In some embodiments, DSS 30 provides both block-based access to logical volumes as well as file-based access to filesystems, both of which may operate on top of a lower-deck filesystem as described in a co-pending U.S. Patent Application entitled "Unified Datapath Storage Processing for Block and File-based Objects," the contents and teachings of which are hereby fully incorporated herein by this reference.

DSS 30 may be any kind of computing device, such as, for example, a personal computer, a workstation, a server, an enterprise server, a laptop computer, a mobile computer, a smart phone, a tablet computer, etc., but it will typically be a server or enterprise server, such as a VNX series or VNXe series data storage system provided by the EMC Corp. of Hopkinton, Mass.

DSS 30 includes a controller 32. Controller 32 may be any kind of processor or set of processors configured to perform operations, such as, for example, a microprocessor, a multi-core microprocessor, a digital signal processor, a collection of electronic circuits, or any combination of the above.

DSS 30 also includes a set of storage drives 34. Drives 34 are persistent storage devices, such as hard disk drives and solid-state storage devices (SSDs) connected either by an internal bus or via a network (e.g., a storage area network). Drives 34 may be arranged in a fault tolerant arrangement, such as in a redundant array of independent disks (RAID), as is well-known in the art. As depicted, drives 34(a)(1)-34(a)(5) form a first RAID group, while drives 34(b)(1)-34(b)(5) form a second RAID group. Each RAID group may be divided into one or more storage volumes, referred to as Flare LUNs or FLUs 36. Thus, two FLUs 36A and 36B are located within the first RAID group, as depicted. As an example, drives 34(a)(1)-34(a)(5) may each be 2 terabyte (TB) drives in a RAID-5 configuration, providing 8 TB of storage. FLU-A 36A may be a storage volume having 5 TB of capacity, while FLU-B 36B may be a storage volume having 3 TB of capacity.

DSS 30 also includes memory 38. Memory 38 may be any kind of digital system memory, such as, for example, RAM. Memory 38 stores programs executing on controller 32 as well as data used by those programs. Memory 38 stores an operating system (OS) 40 and a slice consistency check program 44, both of which run on controller 32. Memory 38 may include both a system memory portion for storing programs and data in active use by the controller 32 as well as a persistent storage portion (e.g., solid-state storage and/or disk-based storage) for storing programs and data even while the DSS 30 is powered off. However, in some embodiments, persistent storage portion may be included within drives 34. OS 40 and slice consistency check program 44 are typically stored both in system memory and in persistent storage so that they may be loaded into system memory from persistent storage upon a system restart. Slice consistency check program 44, when stored in non-transient form either in system memory or in persistent storage, forms a computer program product. The controller 32 running the slice consistency check program 44 thus forms a specialized circuit constructed and arranged to carry out the various processes described herein. Memory 38 also stores a slice ownership table 46 and a storage stack 42.

Figure 2:
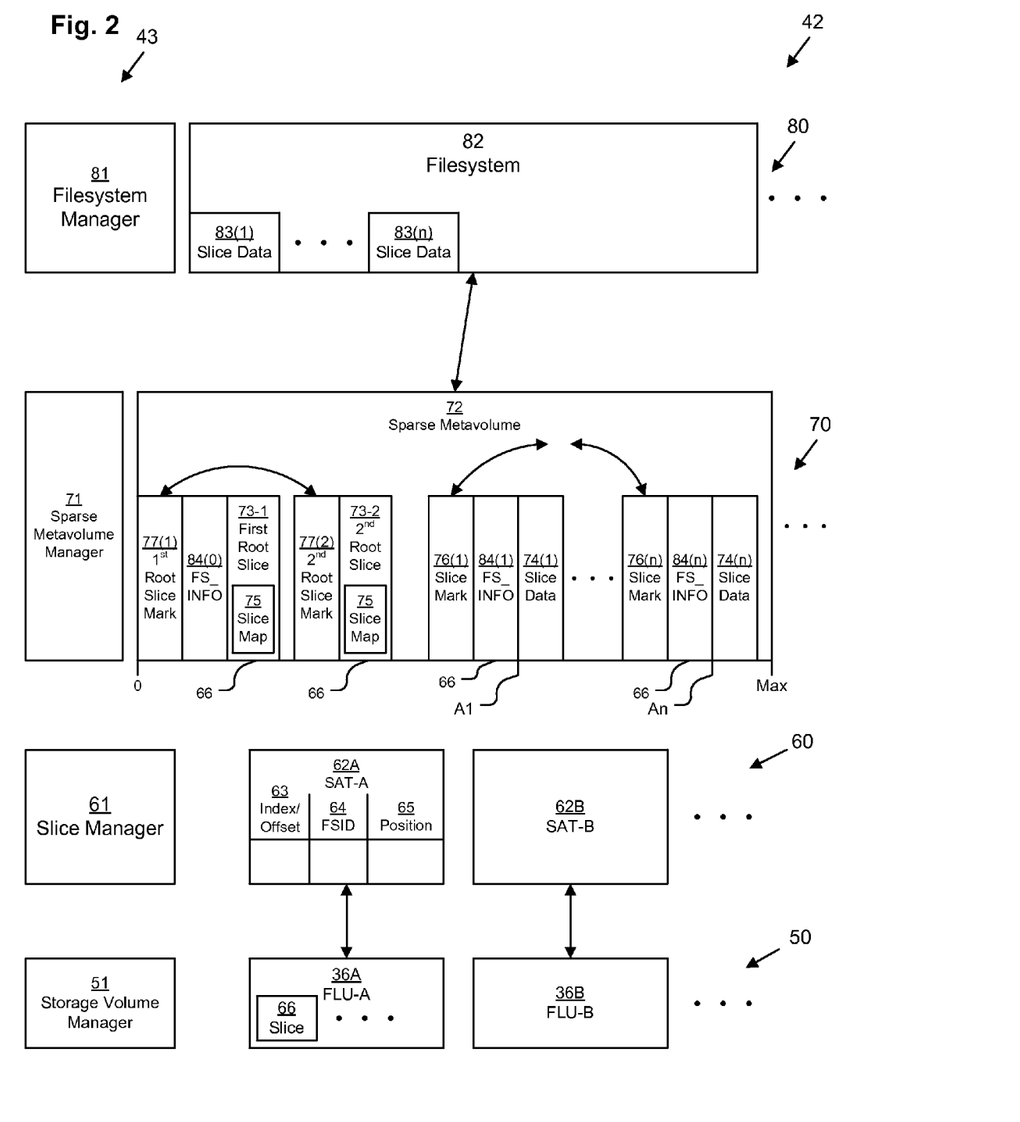
FIG. 2 depicts an example configuration of a storage stack used in conjunction with the example apparatus of FIG. 1 according to various embodiments.

FIG. 2 depicts an example storage stack 42 stored within memory 38 in further detail. Storage stack 42 includes a driver stack 43 having multiple layers 50, 60, 70, 80. Each layer includes a driver 51, 61, 71, 81. Each driver of the driver stack 43 works in conjunction with various data structures or logical constructs. Thus, the lowest level on the driver stack 43 is the storage volume management layer 50, controlled by the storage volume manager 51, which is responsible for dividing the RAID groups of drives 34 into FLUs 36.

The next layer in the driver stack 43 is the slice management layer 60, controlled by slice manager 61. Slice manager 61 allocates and manages slices 66 within FLUs 36. In a typical arrangement, each slice 66 is of equal size (e.g., 256 MB or 1 GB). Thus, for example, if FLU-A 36A has 5 TB of capacity, then it may include approximately 20,000 slices 66.

Slice manager 61 maintains this slice allocation information in a slice allocation table (SAT) 62 for each FLU 36. Thus, as depicted, SAT-A 62A is associated with FLU-A 36A and SAT-B 62B is associated with FLU-B 36B. Each SAT 62 may be organized in various ways, but, in some embodiments, each SAT 62 is organized as an array or a table having three columns. A first column 63 of the table (or, in the case of an array, the array index) stores an index indicating a device offset within the FLU 36. A second column 64 stores a filesystem identifier (FSID), which uniquely identifies which filesystem the slice 66 has been allocated to. It should be noted that, since there is typically a 1:1 correspondence between sparse metavolumes and filesystems, the FSID 64 also identifies which sparse metavolume the slice 66 is owned by. Until a slice 66 has been allocated to a particular sparse metavolume, the FSID column 64 is left blank or NULL for that entry. A third column 65 stores the position within the FLU 36 at which the slice 66 begins. Thus, given a SAT 62 and its associated FLU 36, one can identify every slice 66 within that FLU by its position 65 and its owner (by looking at FSID column 64).

The next layer in the driver stack 43 is the sparse metavolume management layer 70, controlled by sparse metavolume manager 71. Sparse metavolume manager 71 manages a set of sparse metavolumes 72 (only one of which is depicted). It should be noted that sparse metavolume 72 is a purely logical construct—an address space ranging from 0 to Max (for example, $2^{52}$) within which various slices 66 making up the sparse metavolume 72 are logically placed in a sparse manner. Each sparse metavolume 72 includes a first root slice 73-1 as well as a set of slice data portions 74 (depicted as slice data portions 74(1) . . . 74(n)). First root slice 73-1 includes a slice map 75 which (as described in further detail below) maps the positions ((e.g., A1, . . . , An) within the sparse metavolume's address space at which each slice data portion 74 begins. In some cases, slice map 75 will not fit entirely within first root slice 73-1. In such cases, additional root slices, such as second root slice 73-2 may be used as well.

It should be understood that, although every slice 66 has a certain usable size (e.g., 256 MB), there is also a header at the beginning of each slice (e.g., an extra 512 KB) in which certain metadata for that slice 66 may be stored. The header is actually stored in conjunction with the slice 66 within an FLU 36. As depicted, the slice map 75 stores the positions A1, . . . , An at which the slice data portions 74 begin, but, in other embodiments, the slice map 75 may instead store the positions at which the header of each slice 66 begins. At the beginning of the header of each slice 66 is a slice mark 76 (depicted as slice marks 76(1), . . . , 76(n)), which stores various metadata for its respective slice 66 as recorded by the sparse metavolume manager 71. Each slice mark 76 is also part of a doubly-linked list, allowing the previous and next slices 66 allocated to the sparse metavolume to be located (since the logical address space is only sparsely populated). Root slice marks 77 (similar to slice marks 76) also precede each respective root slice 73. Each root slice mark 77 is also part of a doubly-linked list (separate from the doubly-linked list of non-root slice 74), allowing the previous and next root slices 73 allocated to the sparse metavolume to be located.

The next layer in the driver stack 43 is the filesystem management layer 80, controlled by filesystem manager 81. Filesystem manager 81 manages a set of filesystems 82 (only one of which is depicted). Each sparse metavolume 72 stores exactly one filesystem 82. It should be noted that filesystem 82 is a purely logical construct—an address space (typically of a similar size as the address space of a sparse metavolume 72) within which various slice data portions 83 making up the filesystem 82 are logically placed. In some embodiments, the slice data portions 83 may be placed within the address space of the filesystem 82 in a sparse manner, while in other embodiments, the slice data portions 83 may be placed contiguously within the address space of the filesystem 82. Filesystem manager 81 is not able to access the slice marks 76 managed by the sparse metavolume manager 71, but filesystem manager 81 is able to access a portion of the header of each slice 66 in which it stores a filesystem information block FS_INFO 84 (depicted as FS_INFO 84(a), ..., 84(n)). In some embodiments root slices do not contain filesystem information block FS_INFO 84, while in other embodiments, only the first root slice 73-1 contains a filesystem information bloc FS_INFO 84(0), but second root slice 73-2 and beyond do not contain filesystem information blocks FS_INFO 84.

Figure 3:
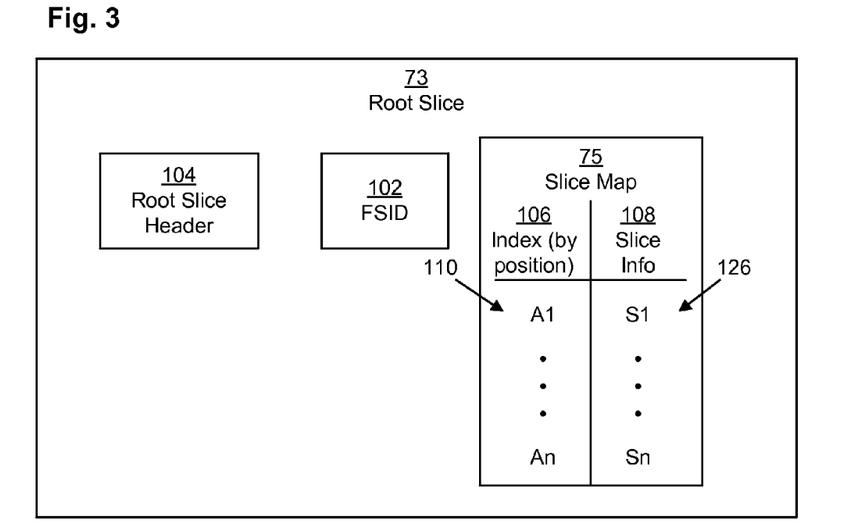
FIG. 3 depicts an example configuration of a root slice used in conjunction with the example apparatus of FIG. 1 according to various embodiments.

FIG. 3 depicts an example root slice 73 in further detail. Root slice 73 includes an identification of the FSID 102 of the associated filesystem 82 (since there is a 1:1 correspondence between sparse metavolumes 72 and filesystems 82). Root slice 73 also includes a header 104. Root slice 73 also stores slice map 75. Slice map 75 may be organized in various ways, but, in some embodiments, each slice map 75 is organized as an array or a table having two columns. A first column 106 of the table (or, in the case of an array, the array index) stores an index 110 representing a position of each slice within the sparse metavolume 72. In some embodiments (as depicted), the position 110 points to the beginning of the slice data portion 74 for a particular slice 66, although in other embodiments, the position 110 points to the beginning of the slice mark 76 for the particular slice 66. Thus, given the slice map 75 in the context of a particular filesystem 72, one can identify every slice 66 owned by that filesystem 72 and establish the position of each owned slice 66 within the sparse metavolume 72.

A second column 108 stores slice information blocks 126 for each slice 66 in the sparse metavolume 72. Slice information blocks 126 each include a device identifier and a device offset to allow locating the slice 66 within SAT 62 or FLU 36.

For example, at index A1, the first slice 66 of the chain of slices 66 (excluding the root slice 73) has slice data portion 74(1) at position A1 and the last slice 66, at index An, of the chain of slices 66 (excluding the root slice 73) has slice data portion 74(n) at position An.

Figure 4:
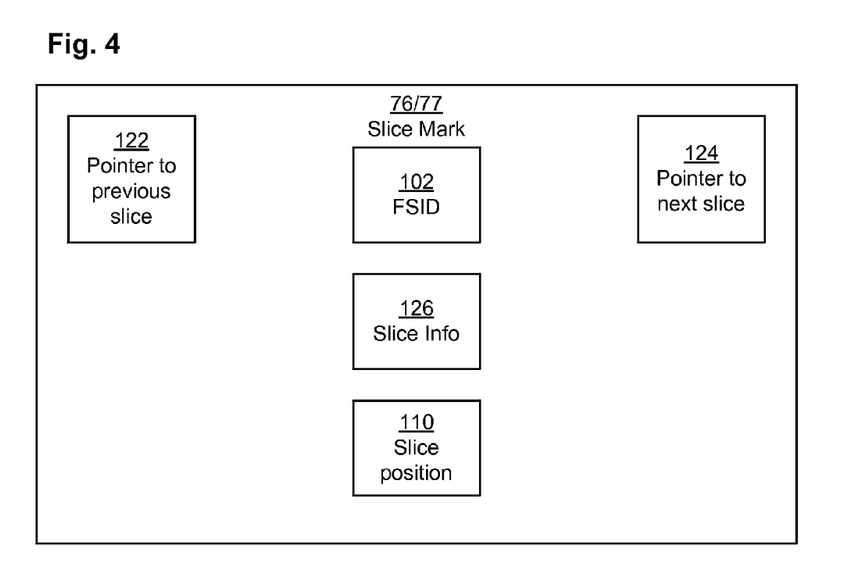
FIG. 4 depicts an example configuration of a slice mark used in conjunction with the example apparatus of FIG. 1 according to various embodiments.

FIG. 4 depicts an example slice mark 76 (similar to a root slice 77) in further detail. Slice mark 76 includes an identification of the FSID 102 of the associated filesystem 82 (since there is a 1:1 correspondence between sparse metavolumes 72 and filesystems 82). Slice mark 76 also includes a slice information block 126 and a slice position 110. Slice mark 76 also implements the doubly-linked list of slices 66 by including a pointer 122 to the previous slice 66 within the chain of slices 66 and a pointer 124 to the next slice 66 within the chain of slices 66. Thus, for example, root slice mark 76(0) has a null value in pointer 122, while pointer 124 contains a pointer to the second root slice 73-2. Continuing in the example, slice mark 76(1) has a null value in pointer 122, and the position within the sparse metavolume 72 of the next data portion 74 within the chain of slices 66 in pointer 124. Thus, given any slice 66 within the chain of slices 66, the ownership of that slice can be obtained by reading the FSID 102 from the slice mark 76 of that slice 66 and the other slices 66 with the same ownership can also be identified by traversing the doubly-linked list. The position of that slice 66 within the sparse metavolume 72 can be determined with reference to the slice position stored within its slice mark 76.

Figure 5:
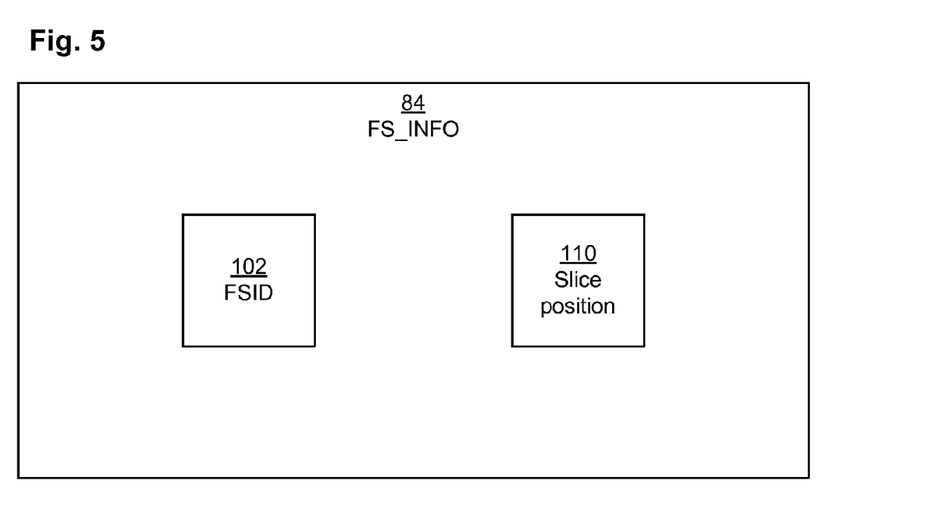
FIG. 5 depicts an example configuration of a file system information block used in conjunction with the example apparatus of FIG. 1 according to various embodiments.

FIG. 5 depicts an example FS_INFO block 84 in further detail. FS_INFO block 84 includes an identification of the FSID 102 of the associated filesystem 82. FS_INFO block 84 also includes position 110. Thus, given any slice 66, the ownership of that slice can be obtained by reading the FSID 102 from the FS_INFO block 84 of that slice 66 and the position 110 from the FS_INFO block 84 of that slice 66.

Figure 6:
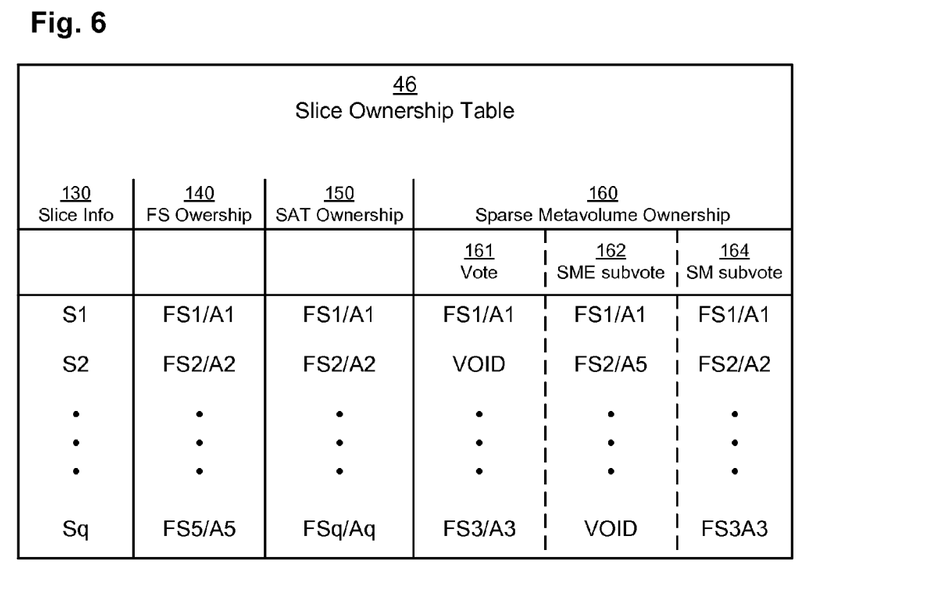
FIG. 6 depicts an example configuration of a slice ownership table used in conjunction with the example apparatus of FIG. 1 according to various embodiments.

FIG. 6 depicts an example slice ownership table 46 stored in memory 38 which is used by slice consistency check program 44 during the course of a slice consistency check. Slice consistency check program 44 uses slice ownership table 44 to store votes for the ownership of every slice 66 within DSS 30. The ownership of a slice 66 is defined to be an identification of the particular filesystem 82 (equivalent to identifying the associated sparse metavolume 72) to which that slice is allocated as well the position of that slice within the sparse metavolume 72. A first column 130 of the slice ownership table 46 represents the slice information block 126 of a particular slice 66.

Column 140 represents a vote for the ownership of that particular slice 66 according to the filesystem manager 81 (based on the FSID 102 stored within the FS_INFO block 84 for that slice and the slice position 110 stored within that FS_INFO block 84).

Column 150 represents a vote for the ownership of that particular slice 66 according to the slice manager 61 (based on the FSID column 64 entry stored within the SAT 62 for that slice 66 and the position column 65 entry stored within the SAT 62 for that slice 66).

Column 160 represents a vote for the ownership of that particular slice 66 according to the sparse metavolume manager 71, the vote being stored within sub-column 161 and being based on a combination of subvotes from sub-columns 162 and 164. Sub-column 162 represents a sub-vote for the ownership of that particular slice 66 according to the slice map 75 based on the FSID 102 of the root slice 73 having a slice map 75 that includes an entry for that slice 66 (having the correct slice information block 126 for that slice), unless the slice maps 75 for multiple root slices 73 include entries for that slice 66, in which case the sub-vote is void. The first sub-vote in column 162 also includes the position 110 index from column 106 of the identified entry.

Sub-column 164 represents a sub-vote for the ownership of that particular slice 66 according to the slice marks 76 (based on the FSID 102 and the slice position 110 of the slice mark 76 of that slice 66). If both sub-votes are the same, then that value is stored in sub-column 161 as the vote for the ownership of that particular slice 66 according to the sparse metavolume manager 71. However, if the sub-votes differ, then the vote for the ownership of that particular slice 66 according to the sparse metavolume manager 71 stored in column 161 is void. If one sub-vote is void, then the vote for the ownership of that particular slice 66 according to the sparse metavolume manager 71 stored in column 161 is defined by the non-void sub-vote.

Figure 7:
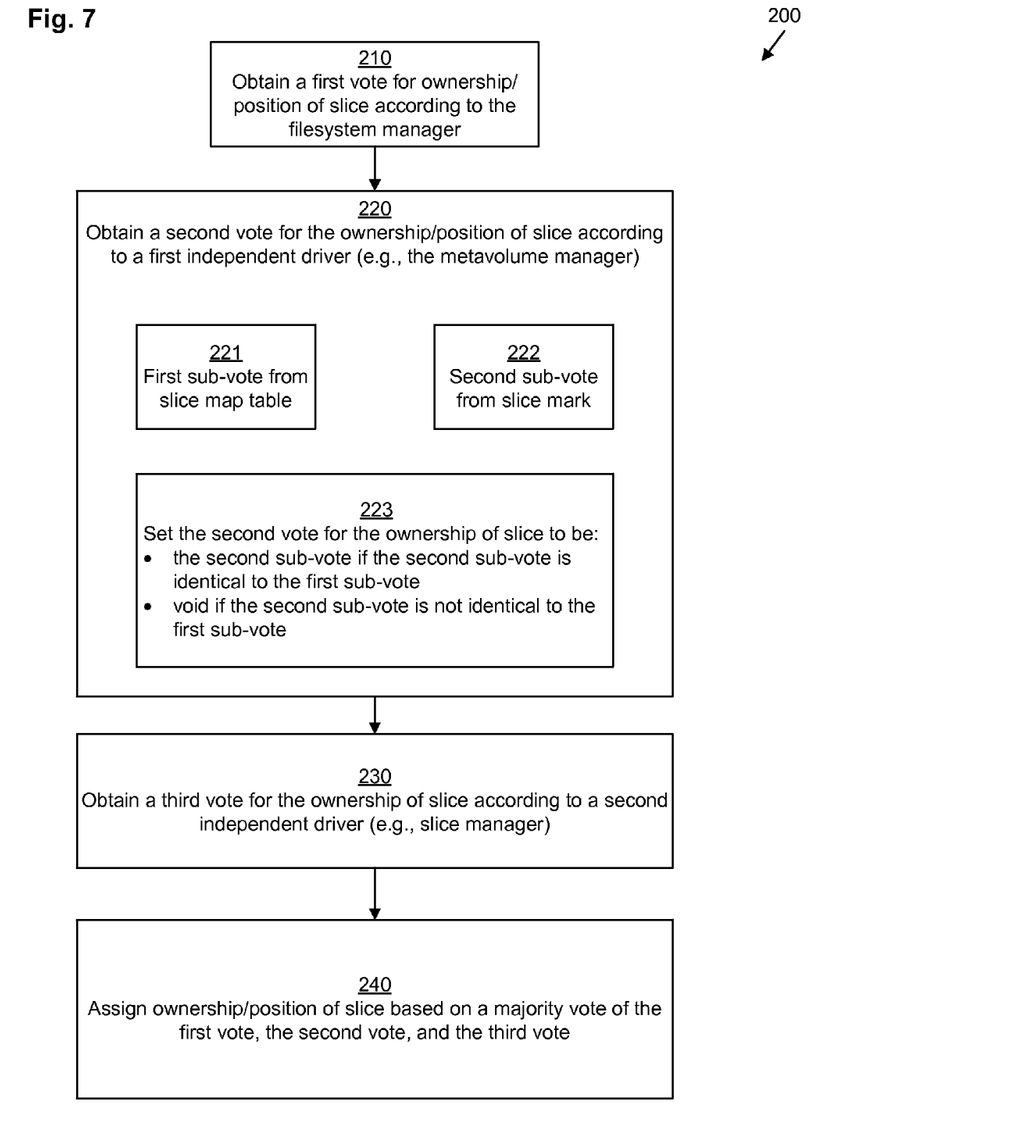
FIG. 7 depicts various example methods according to various embodiments.

FIG. 7 illustrates, as method 200, the operation of slice consistency check program 44 on DSS 30 while performing a slice consistency check on a particular slice according to various embodiments. It should be understood that any time a piece of software, such as, for example, slice consistency check program 44, is described as performing a method, process, step, or function, in actuality what is meant is that a computing device (e.g., DSS 30) on which that piece of software is running performs the method, process, step, or function when executing that piece of software on its processor (e.g., controller 32). It should also be understood that, in some embodiments, instead of controller 32 executing code of slice consistency check program 44, specialized circuitry of the DSS 30 operates to perform the method, process, step, or function directly in hardware.

In step 210, slice consistency check program 44 obtains a first vote 140 for ownership of the slice 66 according to the filesystem manager 81. This may be accomplished with reference to the FSID 102 and position 110 stored within the FS_INFO block 84 of the slice 66.

In step 220, slice consistency check program 44 obtains a second vote 161 for the ownership of the slice 66 according to a first driver of the DSS 30, the first driver being independent of the filesystem manager 81. The first driver may be, for example, sparse metavolume manager 71. In some embodiments step 220 is performed in three sub-steps.

In sub-step 221, slice consistency check program 44 obtains a first sub-vote 162 for the ownership of the slice 66 from a slice map 75. Slice consistency check program 44 determines if any root slice 73 of any sparse metavolume 72 contains a slice map 75 which contains an entry for the slice 66. If only one sparse metavolume 72 contains a slice map 75 which contains such an entry, then that sparse metavolume 72 gets the first sub-vote 162 for the ownership of the slice 66 together with position 110 from the slice map 75; otherwise, the first sub-vote 162 for the ownership of the slice 66 is marked void.

In sub-step 222, slice consistency check program 44 obtains a second sub-vote 164 for the ownership of the slice 66 from a slice mark 76. Slice consistency check program 44 sets the second sub-vote 164 for the ownership of the slice 66 based on the FSID 102 and position 110 of the slice mark 76 of the slice 66.

In sub-step 223, the slice consistency check program 44 sets the second vote 161 for the ownership of the slice 66 by combining the first sub-vote 162 for the ownership of the slice 66 and the second sub-vote 164 for the ownership of the slice 66. If both the first sub-vote 162 for the ownership of the slice 66 and the second sub-vote 164 for the ownership of the slice 66 are the same, then the slice consistency check program 44 sets the second vote 161 for the ownership of the slice 66 to be that shared sub-vote. If, however, the first sub-vote 162 for the ownership of the slice 66 and the second sub-vote 164 for the ownership of the slice 66 are different, then the slice consistency check program 44 sets the second vote 161 for the ownership of the slice 66 to be void. If either sub-vote 162, 164 is void, then the vote 161 for the ownership of the slice 66 to the non-void value, but if both are void, then the vote 161 for the ownership of the slice 66 is also void.

In step 230, slice consistency check program 44 obtains a third vote 150 for ownership of the slice 66 according to a second driver of the DSS 30, the second driver being independent of the filesystem manager 81 and the first driver. The second driver may be, for example, slice manager 61. This step may be accomplished with reference to the FSID column 64 entry and the position column 65 entry stored within an SAT 62 for the slice 66.

In step 240, slice consistency check program 44 assigns ownership of the slice 66 based on a majority vote of the first vote 140 for the ownership of the slice 66, the second vote 161 for the ownership of the slice 66, and the third vote 150 for the ownership of the slice 66. If no two of votes 140, 161, and 150 agree, then the slice 66 may be discarded within the context of the slice consistency check until a system administrator is available to attempt to resolve the conflict.

As an example, as depicted in FIG. 6, it can be seen that for a slice 66 having slice information block S1, all three ownership votes 140, 161, and 150 agree that the owner of the slice 66 is filesystem FS1 with position A1, so the slice 66 is assigned to filesystem FS1 at position A1. However, for the slice 66 having slice information block Sq, all three ownership votes 140, 161, and 150 disagree about the position of the slice 66 (with one vote each for filesystem FS5, filesystem FSq, and filesystem FS3), so the slice 66 is discarded until a system administrator is able to resolve the conflict. For the slice 66 having slice information block S2, the positions within sub-votes 162 and 164 disagree, so vote 161 is void. Nevertheless, because votes 140 and 150 agree, the slice with slice information block S2 is assigned to filesystem FS2 with position A2 as voted by votes 140 and 150.

Having described how the improved slice consistency check is performed in the majority of cases, it should be understood that, in certain cases, the slice consistency check is performed differently. For example, when performing a slice consistency check on a root slice 73, slice consistency check program 44 may not able to obtain any votes from the filesystem manager 81 because the root slice 73 is not visible to the filesystem in some embodiments. Thus, in the case of a slice consistency check on a root slice 73, 2:1 majority voting is still performed, but a different set of three votes is utilized. These votes may include (a) a vote of the slice manager 61, (b) a vote of the sparse metavolume 72, and (c) a vote from a persistent storage manager. The persistent storage manager stores certain vital system configuration information (e.g., root slice assignments) in persistent storage to enable recovery after a power failure.

In some arrangements, when multiple root slices 73 are used, in the case of a slice consistency check on an additional root slice (e.g., 73-2), 2:1 majority voting is still performed, but a yet different set of three votes is utilized. These votes may include (a) a vote of the slice manager 61, (b) a vote of the slice marks 76, and (c) a vote from the slice map 75.

Thus, techniques have been described for performing a slice consistency check using a 2:1 voting algorithm giving one vote to a filesystem management layer 80, one vote to a sparse metavolume management layer 70 (combining views of the slice map 75 and the slice marks 76), and one vote to a slice management layer 60.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. In a data storage system (DSS), the DSS having a plurality of drives, the plurality of drives forming a plurality of storage volumes, each storage volume providing a plurality of data storage slices, the DSS having a set of sparse metavolumes, each sparse metavolume having a set of slices owned by that metavolume, the set of slices providing storage for that sparse metavolume, a method of performing a slice consistency check, the method comprising, for each slice of a plurality of slices of the set of slices:

obtaining a first vote for ownership of the respective slice according to a filesystem manager configured to manage a set of filesystems stored on the set of sparse metavolumes;

obtaining a second vote for the ownership of the respective slice according to a first driver of the DSS, the first driver being independent of the filesystem manager;

obtaining a third vote for the ownership of the respective slice according to a second driver of the DSS, the second driver being independent of the filesystem manager and the first driver; and     assigning ownership of the respective slice based on a majority vote of the first vote for the ownership of the respective slice, the second vote for the ownership of the respective slice, and the third vote for the ownership of the respective slice;

wherein:

obtaining the second vote for the ownership of the respective slice according to the first driver of the DSS includes:

obtaining a first sub-vote for the ownership of the respective slice;

obtaining a second sub-vote for the ownership of the respective slice; and         setting the second vote for the ownership of the respective slice to be:

the second sub-vote if either (a) the second sub-vote is identical to the first sub-vote or (b) the first sub-vote is void; and             otherwise void.

2. The method of claim 1, wherein:

the set of sparse metavolumes is managed by a metavolume manager;

the first driver is the metavolume manager;

obtaining the first sub-vote for the ownership of the respective slice includes testing, for each sparse metavolume of the set of sparse metavolumes, whether a slice map table stored within a root slice of that sparse metavolume indicates that the respective slice is owned by that sparse metavolume, the slice map table being managed by the metavolume manager, the first sub-vote being void if multiple distinct sparse metavolumes of the set of sparse metavolumes are indicated as owning the respective slice; and obtaining the second sub-vote for the ownership of the respective slice includes reading a sparse metavolume identifier stored within a slice mark of the respective slice, the slice mark of the respective slice being managed by the metavolume manager, the slice mark of the respective slice being in a region of the respective slice separate from a data storage area of the respective slice.

3. The method of claim 2 wherein:

obtaining the first sub-vote further includes obtaining a position within the sparse metavolume of the respective slice as indicated by the slice map table stored within the root slice of that sparse metavolume; and obtaining the first sub-vote further includes reading a position stored within the slice mark of the respective slice.

4. The method of claim 2, wherein:

the second driver is a slice manager configured to manage a slice allocation table for each storage volume of the plurality of storage volumes; and obtaining the third vote for the ownership of the respective slice according to the second driver of the DSS includes reading a sparse metavolume identifier stored within an entry of the slice allocation table for one storage volume, the entry being associated with the respective slice.

5. The method of claim 4 wherein obtaining the third vote for the ownership of the respective slice according to the second driver further includes reading a position stored within the entry of the slice allocation table associated with the respective slice.

6. The method of claim 2, wherein the method further comprises, for a root slice of a sparse metavolume of the set of sparse metavolumes:

obtaining a first vote for ownership of the root slice according to the metavolume manager;

obtaining a second vote for the ownership of the root slice according to a persistent storage manager;

obtaining a third vote for the ownership of the root slice by reading a sparse metavolume identifier stored within an entry of a slice allocation table, the entry being associated with the root slice; and     assigning ownership of the root slice based on a majority vote of the first vote for the ownership of the root slice, the second vote for the ownership of the root slice, and the third vote for the ownership of the root slice.

7. The method of claim 6 wherein obtaining the third vote for the ownership of the root slice further includes reading a position stored within the entry of the slice allocation table associated with the respective slice.

8. The method of claim 1, wherein obtaining the first vote for the ownership of the respective slice according to the filesystem manager includes reading a sparse metavolume identifier stored within a filesystem information block of the respective slice, the filesystem information block of the respective slice being managed by the filesystem manager, the filesystem information block of the respective slice being in a region of the respective slice separate from a data storage area of the respective slice.

9. The method of claim 8 wherein obtaining the first vote for the ownership of the root slice further includes reading a position stored within the filesystem information block of the respective slice.

10. The method of claim 1, wherein assigning ownership of the respective slice based on a majority vote of the first vote for the ownership of the respective slice, the second vote for the ownership of the respective slice, and the third vote for the ownership of the respective slice includes:

when two of the first vote for the ownership of the respective slice, the second vote for the ownership of the respective slice, and the third vote for the ownership of the respective slice agree, assigning the ownership of the respective slice based on the vote of two of the first vote for the ownership of the respective slice, the second vote for the ownership of the respective slice, and the third vote for the ownership of the respective slice; and     when no two of the first vote for the ownership of the respective slice, the second vote for the ownership of the respective slice, and the third vote for the ownership of the respective slice agree, discarding the respective slice from the slice consistency check.

11. An apparatus comprising:

a plurality of drives;

a controller; and memory, the memory storing a data storage driver stack, the data storage driver stack including:

a storage volume manager for allocating space on the plurality of drives to a plurality of storage volumes;

a slice manager for allocating space within the plurality of storage volumes to a plurality of data storage slices, the slice manager managing a slice allocation table for each storage volume of the plurality of storage volumes;

a metavolume manager for allocating slices of the plurality of slices to a plurality of sparse metavolumes managed by the metavolume manager, each sparse metavolume including a root slice including a slice map assigning each slice allocated to that sparse metavolume to a position within that sparse metavolume;

a filesystem manager for managing a plurality of filesystems, each filesystem of the plurality of filesystems being stored on a unique sparse metavolume of the plurality of sparse metavolumes;

wherein:
each slice allocation table includes a plurality of slice entries which associate particular slices with:
a particular sparse metavolume identifier for the sparse metavolume that the particular slice is allocated to; and
a particular position within the sparse metavolume that the particular slice is allocated to;
each slice allocated to a sparse metavolume includes a slice mark that stores:
a sparse metavolume identifier for the sparse metavolume that the respective slice is allocated to; and
a pointer to a position of a previous slice allocated to the sparse metavolume that the respective slice is allocated to; and
a pointer to a position of a next slice allocated to the sparse metavolume that the respective slice is allocated to; and
each slice allocated to a sparse metavolume other than a root slice includes a filesystem information block managed by filesystem manager, the filesystem information block storing:
a sparse metavolume identifier for the sparse metavolume that the respective slice is allocated to; and
a position within the sparse metavolume that the respective slice is allocated to;

wherein the controller is configured to perform a slice consistency check by, for each slice of a set of slices of the plurality of slices:
obtaining a first vote for ownership of the respective slice according to the filesystem manager with reference to the sparse metavolume identifier of the filesystem information block of the respective slice;
obtaining a second vote for the ownership of the respective slice according to the metavolume manager with reference to the slice mark of the respective slice and the slice maps of the root slices of the plurality of sparse metavolumes;
obtaining the third vote for the ownership of the respective slice according to the slice manager with reference to the sparse metavolume identifier of the slice entry associated with the respective slice from a slice allocation table; and
assigning ownership of the respective slice based on a majority vote of the first vote for the ownership of the respective slice, the second vote for the ownership of the respective slice, and the third vote for the ownership of the respective slice.

12. A computer program product comprising a non-transitory computer-readable storage medium storing a set of instruction, which, when executed by a data storage system (DSS) computer having a plurality of drives, the plurality of drives forming a plurality of storage volumes, each storage volume providing a plurality of data storage slices, the DSS computer having a set of sparse metavolumes, each sparse metavolume having a set of slices owned by that metavolume, the set of slices providing storage for that sparse metavolume, cause the DSS computer to perform a slice consistency check by, for each slice of a plurality of slices of the set of slices:
obtaining a first vote for the ownership of the respective slice according to a filesystem manager configured to manage a set of filesystems stored on the set of sparse metavolumes;
obtaining a second vote for the ownership of the respective slice according to a first driver of the DSS computer, the first driver being independent of the filesystem manager;
obtaining a third vote for the ownership of the respective slice according to a second driver of the DSS computer, the second driver being independent of the filesystem manager and the first driver; and
assigning ownership of the respective slice based on a majority vote of the first vote for the ownership of the respective slice, the second vote for the ownership of the respective slice, and the third vote for the ownership of the respective slice;

wherein:
obtaining the second vote for the ownership of the respective slice according to the first driver of the DSS includes:
obtaining a first sub-vote for the ownership of the respective slice;
obtaining a second sub-vote for the ownership of the respective slice; and
setting the second vote for the ownership of the respective slice to be:
the second sub-vote if either (a) the second sub-vote is identical to the first sub-vote or (b) the first sub-vote is void; and
otherwise void.

13. The computer program product of claim 12, wherein:
the set of sparse metavolumes is managed by a metavolume manager;
the first driver is the metavolume manager;
obtaining the first sub-vote for the ownership of the respective slice includes testing, for each sparse metavolume of the set of sparse metavolumes, whether a slice map table stored within a root slice of that sparse metavolume indicates that the respective slice is owned by that sparse metavolume, the slice map table being managed by the metavolume manager, the first sub-vote being void if multiple distinct sparse metavolumes of the set of sparse metavolumes are indicated as owning the respective slice; and
obtaining the second sub-vote for the ownership of the respective slice includes reading a sparse metavolume identifier stored within a slice mark of the respective slice, the slice mark of the respective slice being managed by the metavolume manager, the slice mark of the respective slice being in a region of the respective slice separate from a data storage area of the respective slice.

* * * * *